United States Patent Office 3,471,017
Patented Oct. 7, 1969

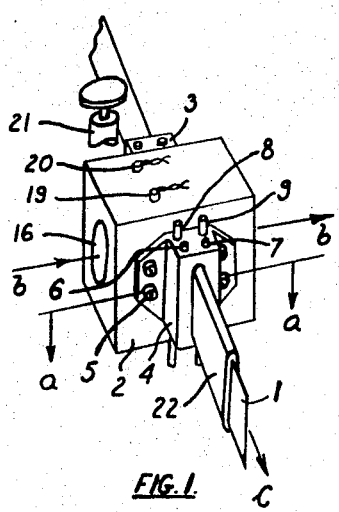

3,471,017
FILTERING PROCESS AND APPARATUS
Peter Gabor Kalman, 51 Compayne Gardens,
London NW. 6, England
Filed June 20, 1967, Ser. No. 647,435
Claims priority, application Great Britain, Feb. 21, 1967,
8,122/67
Int. Cl. B01d 35/18
U.S. Cl. 210—71                                      43 Claims

ABSTRACT OF THE DISCLOSURE

Process and apparatus for filtering heat-softened plastics materials by introducing a filter ribbon across a passage through which said material flows, the filter being passed through slotted inlet and outlet ports flanking said passage and conditions being maintained at said ports resulting in the formation of solidified sealing plugs of said material in said ports which yet permit continuous or intermittent movement of said filter ribbon across said passage to renew the used part of the filter without substantial leakage of plastics material.

---

This invention relates to a process and apparatus for filtering a substance flowing through a passage by the introduction of a filter across such passage and is particularly but not exclusively concerned with the filtering of heat-softened plastics materials.

The extrusion process, in which heat-softened plastics materials are extruded through a die by screw or ram, is the starting process for a number of forming methods employed in the manufacture of plastics articles. In the presence of impurities in the raw materials it becomes necessary to purify these materials before further processing and this is usually carried out by straining the thermally softened plastics through a disc of stainless steel filter cloth incorporated into an extruder. During such filtering a disc of wire cloth of suitable mesh size, often a laminate of several such cloths, is supported on a perforated backing plate within the stream of hot, softened plastics material between the screw or ram and the due of an extruder; in time this disc becomes clogged with impurities and must be replaced. The opening up of a hot extruder in order to effect replacement of the filter screen interrupts production and is of considerable inconvenience to operating personnel during the accompanying manual extraction of the clogged filter; when still hot it presents risks of scalding and when cold it is cemented into position by solidified plastics material and has to be laboriously hacked out to permit its replacement with a fresh screen.

To alleviate the difficulties inherent in this cumbersome operation it is known art to employ two distinct filter gauzes supported by separate perforated backing discs and when one becomes clogged the other is made to continue filtering. This is achieved either by redirecting the flow from one filter disc to the other by means of a valve or by incorporating the two filters and their supports in a slide which can be periodically reciprocated transversely to the flow of the plastics material. Eventually however the clogged or damaged filter discs still require replacement and this is an essentially manual operation involving work with hot and sticky objects and regular attendance by personnel. These known methods usually involve metal to metal sealing necessitating high actuating forces and the use of costly hydraulic equipment if leakage is to be minimized.

The present invention seeks to overcome those disadvantages by utilizing a filter ribbon or band of extended length passing through the flow path of the material being filtered by transversing thermal inlet and exit seals which make use of the temperature-dependent viscoelastic properties of the materials—such as polyolefins, for example polyethylene—being filtered. This method permits gradual replacement of the clogged filter screen areas with fresh filter areas of the same ribbon either continuously or in steps; in either case no interruption of the extrusion process is occasioned with particularly beneficial consequence when extrusions of considerable lengths and uniformity are manufactured such as tubing or plastics covered cable, where even short interruptions cause the rejection of large quantities of the product. The method requires no manual digging-out of spent filters from their enclosures, both the introduction of fresh filtering zones and the simultaneous ejection of the spent filtering zones forming an automatic process requiring little attention and no physical effort. Additionally, the considerable hydrostatic presure present within an extruder causes no sealing difficulties, such as those which arise with the known methods, but can be turned to good advantage by providing the driving force required for forwarding the filter ribbon through the extruder.

Generally, the invention consists in a filtering enclosure through which an extended ribbon of filter screen passes and in two slotted sealing ports which are situated at the inlet and exit zones of the filter ribbon respectively. It is typically, though not necessarily, situated between the screw and the die of a plastics extruder and forms a part of the flowpath of the hot plastics material which is extruded.

The enclosure containing the hot plastics melt is maintained at an elevated temperature appropriate to imparting to the melt the comparatively moderate viscosity required for the filtering and extrusion processes but the mean temperature within the operative sections of the sealing ports are kept within a lower temperature range and the quantities of rigid and semi-rigid plastics material situated within the channels of these ports act as self replacing sealing plugs at the entry and exit zones of the filter ribbon. The movement of one of these plugs through its sealing port depends on the hydrostatic pressure of the melt, on the force exerted on the plug by the filter ribbon passing through or besides it and is particularly dependent also on the shape, curvature and aperture size of the passage within the sealing port through which the plug passes and also on the temperature distribution and the corresponding visco-elastic and adhesive properties established within the plug and at its boundaries. All these conditions influence the formation of and speed at which the plastics plug passes through the sealing port which contains it and can be employed, singly or in combination, to control its movement. The filter screen may advantageously be embedded in the plug at the exit side and in this case the rate at which the screen is changed within the filtering enclosure can be easily regulated by controlling the rate of extrusion of the plastics plug which, in this case, forwards it.

With reference to the appended drawings, FIG. 1 shows a general arrangement of a preferred embodiment of the invention, FIG. 2 represents a section through this embodiment as seen in the direction of arrows a—a, FIG. 3 shows the construction of a breaker plate, viewed in the direction of arrows b—b, forming a part of the embodiment shown in FIGS. 1 and 2; FIGS. 4 to 10 show sectioned views of alternative embodiments of a sealing port suitable for forming part of the embodiment of the invention described, viewed in the direction of arrows a—a, FIG. 11 shows an auxiliary forwarding device suitable for use with the invention, FIG. 12 shows an auxiliary retarding device adapted for use with the invention and FIG. 13 shows a sectional view taken in the plane of the filter ribbon of a further embodiment of a sealing port suitable for forming part of the embodiment shown in FIGS. 1 and 2 viewed in the direction of arrows b—b.

With reference to FIGS. 1 and 2, filter ribbbon 1 passes through filtering enclosure 2 by way of sealing ports 3 and 4, held onto the enclosure by means of bolts, one of which is shown at 5. Outlet port 4 is provided with cartridge heaters 6 and 7 and also with water cooling channels 8 and 9; similarly inlet port 3 is provided with cartridge heaters 10 and 11 and with water cooling channels 12 and 13. Ribbon 1 enters enclosure 2 through a slot 14 in the inlet port 3 and leaves it through the tapered slot 15 in the exit port 4 and is forwarded in the direction of arrow c. Ports 3 and 4 are substantially similar except for the entry slot 14 which is parallel sided and of narrower width than the exit slot 15. Heat softened plastics material passes through bore 16 in enclosure 2 in the direction of the arrows b—b and passes through filter ribbon 1 which is supported on breaker plate 17 held in sleeve 18. Cartridge heaters 19 and 20 are provided for heating the filtering enclosure 2. A movement sensing device 21 is provided at the inlet side to sense the forwarding movement of ribbon 1 through the filtering enclosure 2. A solidified plastics liner 22 forms around ribbon 1 at the exit side and contains the impurities removed from the melt by the filtering process. Filtering enclosure 2 is maintained by heaters 19 and 20 at a steady elevated temperature appropriate to the requirements of the extrusion and filtering processes for the material concerned, for example 160° C. for an average low density polyethylene. Inlet port 3 and outlet port 4 are made of a material of high thermal conductivity, for example beryllium copper and are generally maintained at about room temperature by a suitable coolant such as water flowing through channels 8, 9, 12 and 13. Ports 3 and 4 are provided with raised lips where they abut against filtering enclosure 2 so as to minimize heat flow from the enclosure 2. Whilst this condition is maintained solid plastics plugs are formed within ports 3 and 4 which seal the filtering enclosure at both sides and prevent movement of ribbon 1. The latter is forwarded through the filtering enclosure in steps by periodically shutting off the water supply to ports 3 and 4 by means of a valve, not shown, and by raising the temperatures of these ports by means of the cartridge heaters 6, 7, 10 and 11. As the outer skins of the substantially solid plastics plugs within ports 3 and 4 gradually soften ribbon 1 becomes free to move. Since the cross-sectional area of exit slot 15 is larger than that of inlet slot 14 and since both plugs are still keyed onto ribbon 1 a net hydrostatic force exists which forwards ribbon 1 in the direction of arrow c together with the two plugs. Exit slot 15 narrows in the direction of movement so that the plastics plug contained within it must change its shape as it squeezes through, taking ribbon 1 with it. This deformation is dependent, among other factors, particularly strongly on the heat supplied to the plugs and therefore the rate of forwarding can be conveniently controlled by regulating the heat input to ports 3 and 4. At the inlet side slot 14 in the inlet port 3 contains only enough plastics material around or beside ribbon 1 to provide a pressure seal; when port 3 is at a raised temperature the inlet plug softens and offers little resistance to the forwarding pull. When the movement sensing device 21—which may consist of a friction wheel carrying a circular moire grating or some other known device as used in numerical movement control—registers that ribbon 1 has been forwarded by a pre-set amount heating of ports 3 and 4 is discontinued and their water supply is reestablished. Owing to the high thermal conductivity of the material, for example beryllium copper, of which ports 3 and 4 are made the plastics plugs within them speedily re-solidify and movement of ribbon 1 is arrested almost immediately. The forwarding movement is set so as not to exceed the length of slot 15 in port 4 and is generally a fraction of the diameter of the bore 16. When both entry and exit plugs have fully re-solidified ribbon 1 may be indexed forward again by reheating ports 3 and 4. The repetition rate may be present by using a suitable timer or alternatively ribbon 1 may be forwarded whenever a pressure transducer of a known type, installed upstream of ribbon 1, indicates a rising pressure due to excessive clogging-up of the filter. It will be readily appreciated that the sealing plugs within slots 14 and 15 need not necessarily be heated by means of cartridge heaters but that any other readily controllable heating means may be employed; for example a heating current may be passed through the filter ribbon 1 itself if it is made of a material of suitable electrical conductivity such as Nichrome wire cloth, or alternatively heat may be supplied to ports 3 and 4 by circulating a suitable heat transfer medium such as Silicone oil through apertures provided in these ports. Ribbon 1 is preferably made of Dutch weave stainless steel wire cloth which has superior filtering properties and is supported over a breaker plate 17 which is preferably of the slotted construction shown in FIG. 3. A multitude of rectangular windows such as 23 are formed in this plate by two sets of interpenetrating slots, one slot being shown at 24, cut into the plate at right angles to each other, one set from each face with the slots adjoining ribbon 1 oriented parallel with the direction of forwarding the latter so as to offer minimal resistance to movement. It will be clear that laminate structures may also be employed as filter ribbons should, for example, strength considerations so require.

It will be ready seen by those skilled in the art that the invention lends itself also to continuous rather than periodic operation; in this method of operating the invention ports 3 and 4 are maintained at intermediate temperatures which facilitate the required slow but continuous forwarding of ribbon 1 through the apparatus. As in this mode of operation the material contained in the exit wedge 15 has more time to melt in depth it becomes desirable to augment its pressure sealing action by the addition of a further thermal sealing zone. An alternative embodiment of an exit port in accordance with the invention which is particularly suitable for continuous filter screen changing is shown in FIG. 4. This embodiment is provided with an additional, substantially parallel walled outer sealing zone 25 permanently maintained at a temperature lower than that of the remainder of the sealing port and accordingly this zone contains almost fully solidified material which as as a resilient sliding plug and assists in preventing the egress of semi-molten material. The narrow wait 26 serve to minimize heat flow between the tapered and the parallel walled sections of the exit port which are maintained at different temperatures by means of the cartridge heaters 27 and 28, by heat conducted from enclosure 2 and by coolant flow in channels 29, 30, 31 and 32. For example, in a typical filtering and extrusion run with a low density polyethylene material during which the pressure in the filtering enclosure was 4000 p.s.i. and the temperature 150° C., the inlet port was maintained at 80° C., the inner wedge-apertured part of the exit port at 110° C. and the outer, parallel walled sealing zone of the exit port at 45° C., the filter ribbon was forwarded at a steady speed of 0.42" per hour. It will be clear that the desired temperature profile along the exit port may be maintained also by external convection cooling or by the use of the other means in themselves of known art which can serve for maintaining preset temperatures. FIG. 5 shows a cross section of an exit port of laminated construction along which the desired temperature profile is maintained by heat conduction from enclosure 2 and by convection cooling of exposed fins. The port is made up from alternate laminations of poor conductivity such as ceramic sheet 33 interspersed with protruding laminations of high thermal conductivity such as beryllium copper sheet 34, bolted together and to a lipped base 35 by means of bolts 36 and 37; heat conduction from enclosure 2 is limited as desired by the ceramic spacer sheets such as 33 and convection cooling of the protruding high conductivity fins may be augmented by means of a fan, not shown. It will be seen that the tapered zone of the exit slot, in which the plastics material undergoes deformation, controls the speed of filter screen forwardly while the colder, parallel zone acts as a pressure seal and maintains the high extrusion pressure present within enclosure 2 and that these may equally well follow each other in reverse order. Furthermore such a reversed arrangement may also be combined with that shown in FIG. 4, resulting in a sealing port in which two parallel, preferably watercooled end sections are joined by a transition section of diminishing aperture size whose controlled temperature governs the forwarding rate of the filter ribbon.

It will be appreciated that the scope of the invention is not limited to plastics filtering but that apparatus built in accordance with the invention can be employed also for filtering other materials as long as they are capable of solidification when cooled so that substantially pressure-tight sealing plugs can be formed of the material to be filtered within the sealing ports. When a liquid having a well defined solidification temperature is filtered in apparatus in accorrdance with the invention, such as for example water, then the rate of filter ribbon forwarding depends primarily on the rate at which the outer skins of the initially solid sealing plugs, consisting for example of ice, melt into a liquid state incapable of supporting stresses other than hydrostatic pressure thus permitting the still solid cores of these plugs to traverse the channels within the sealing ports. The choice of coolant circulating within channels 8, 9, 12 and 13 in FIGS. 1 and 2 is clearly dependent on the melting temperature of the sealing plugs and the coolant is so chosen that it remains fluid at the lowest temperatures reached within the apparatus. When substances are filtered in apparatus according to the invention which lose their fully solid consistency more gradually on heating then the mechanism whereby the plugs within the sealing ports control the forwarding speed of filter ribbon 1 is believed to be predominantly that of visco-elastic strain relaxation. Plastics, rubber and other materials which are usually extruded invariably possess a somewhat wide transition zone within which the strain release rate and the corresponding rate of overall deformation are controlled by temperature dependent visco-elastic relaxation. As the gradual extrusion of the semi-solid plug within the exit port is believed to be accompanied by laminar shear awakened within the plug at least in part by interface drag generated at the walls of the exit channel and relaxing in time at a temperature controlled rate, hence surface adhesion between the plug and the exit port may also be expected to play a part in determining the forwarding rate of the plug and hence of the filter ribbon. It will be seen by those skilled in the art of the extrusion process that exit port channels other than that of the simple tapered section shown at 15 in FIG. 2 can perform a similar function and control the rate of filter ribbon forwarding provided only that the exit channel is of a geometry such that the passage of the semi-rigid plug along it awakens visco-elastic stresses and corresponding strains within the plug which relax in a temperature and time dependent manner. For example, a localized obstruction such as the constriction shown at 38 in FIG. 6 suffices to slow down the forwarding of a visco-elastic, near-solid plastics plug substantially and in conjunction with temperature control in the critical region of the constriction may be used to control the forwarding rate. Regardless of theory of operation, it is observed that when the filter ribbon is forwarded in apparatus according to the invention by allowing the extrusion pressure of the melt to act on inlet and exit plugs of unequal cross sectional areas the rate of forwarding is strongly dependent on the temperature of at least one of the plugs and this temperature may then be regulated so as to afford control over the rate of filter ribbon forwarding.

It will be obvious that a similarly effective way of operating the invention consists in altering the geometry of both ports 3 and 4 or at least of one of them and controlling the rate of filter ribbon forwarding in this manner without the necessity of temperature changes. An example of an exit port in accordance with the invention and embodying such variable geometry is shown in FIG. 7 where the port is provided with a gate 39 which is pivoted by means of pin 40 to frame 41; the port is kept at a suitable constant temperature by coolant flowing in channels 42 and 43 and the rate of filter ribbon forwarding may be controlled by adjusting screw 44 which determinates the inclination of gate 39. Alternatively, as shown in the further example given in FIG. 8, a sliding wedge 45 may be employed which restricts the exit passage within frame 46 to an adjustable extent as defined by the setting of Allen screw 47 which secures it to frame 46. A further embodiment of an exit port of simple but adjustable geometry is shown in FIG. 9 where grubscrews 48 and 49 carried in frame 50 plough grooves of adjustable depths into the semi-rigid plastics plug passing between them which carries ribbon 1, not shown in this figure, embedded within it.

The examples of alternative sealing ports which are suitable for forming part of apparatus embodying the invention achieve a controlled forwarding rate of the sealing plug by varying the temperature of the plug or by altering the aperture cross section or by relying on both measures simultaneously. An alternative embodiment in which retardation of the plug is brought about by changing its curvature is shown in FIG. 10. It will be seen that as the semi-rigid plastics plug traverses the wavy slot 51 in port 52 the curvature at a given locality within the moving plug undergoes changes so that bending stresses are produced within it. These stresses are brought about by the hydrostatic pressure exerted on the plug by the melt and their rate of relaxation, here governed by the balance of heat inflow from enclosure 2 and the adjustable heat outflow through the coolant channels 53 and 54 determines the rate of filter screen changing. It will be clear that this rate could also be controlled by utilizing an inlet or exit port of variable curvature operating at a suitable constant temperature. It will be understood that whilst the various examples of sealing port construction shown in FIGS. 3 to 10 served to illustrate the way in which exit ports of various types according to the invention may be used to afford control of the filter forwarding speed, the same considerations apply also to the inlet port which may be equally readily employed to control the rate of filter screen forwarding provided only that the inlet channel within the inlet port permits sufficient controlled outward leakage to allow continual replenishment of the material forming the inlet sealing plug.

The rate at which ribbon 1 is forwarded in any of the embodiments of the invention described may be further influenced where desirable by causing direct external forces to act on the ribbon; for example the forwarding movement may be caused or increased by pulling at the emerging end of ribbon 1. One simple way of achieving this is shown in FIG. 11 where filtering enclosure 2 supports bracket 55 to which toggle frame 56 is pivoted by means of pin 59 is urged against the solidified plastics sleeve 22 surrounding ribbon 1 by leaf spring 60, which is fastened to frame 56 by means of screw 61, and grips the sleeve against one side of the frame 56; if the latter is reciprocated in the direction of arrows d—d for example, by means of a penumatic cylinder then sleeve 22 will be gripped and forwarded, then released in turn. In this embodiment of the invention the primary function of exit port 4 is that of providing a thermal pressure seal around ribbon 1 in accordance with the invention and its temperature is advantageously so adjusted that the forwarding thrust produced supplements that provided by the toggle linkage; at any rate the temperature is not allowed to fall so low that excessive resistance is offered to the forwarding pull of the toggle. Similarly the forwarding movement of ribbon 1 may be retarded rather than enhanced by the application of a direct force to ribbon 1 by, for example, a pair of knurled gripper rollers situated on the inlet side as shown in FIG. 12. One gripper roller 62 carrying gear 63 is rotatably mounted by shaft 64 on toggle arm 65 which is pivoted by pin 66 to support 67 carried by enclosure 2. A second gripper roller 68 carrying gear 69 is rotatably mounted by shaft 70 on support 71 also carried by enclosure 2; the sum of the diameters of capstan rollers 62 and 68 plus twice the thickness of the filter ribbon 1 gripped between them is arranged to slightly exceed the sum of the pitch circle diameters of the gears 63 and 69 so that ribbon 1 is firmly gripped as the gears then mesh with a small clearance. Both the inlet and exit channels 14 and 15 may, in this embodiment, be of a simple parallel design the latter having a greater cross sectional area so that a net forwarding hydrostatic force is acting on ribbon 1, the rate of forwarding the latter may then be set as desired by braking at least one of the shafts 64 or 70 in any suitable manner so as to retard the ribbon or by regulating the speed at which the capstans allow the ribbon to enter inlet port 3.

The forwarding force acting on ribbon 1 may be controlled also by varying the hydrostatic thrust exerted on the exit plug by the melt, for example in a manner as shown in FIG. 13. In this embodiment of the invention an exit port according to FIG. 4 is employed but the outer parallel section is extended beyond the edges of filter ribbon 1; FIG. 13 shows a view of this enlargement as seen in the direction of arrows b—b. The extended parallel walled outer sealing zone 72 which here has an increased cross-sectional area is kept cold enough, at least near the vicinity of the outer end of the exit block 73, to ensure satisfactory sealing and the inner, tapered section 74 is maintained at a higher mean temperature as described earlier. Near molten material at the high pressure of the melt is supplied to the extension through channels 75 and 76 from enclosure 2; the ingress of plastics material can be controlled by means of the blocking screws 77 and 78 so that control over the forwarding rate of ribbon 1 is facilitated.

In the embodiment of the invention shown in FIGS. 1 and 2 filter ribbon 1 traverses filtering enclosure 2 substantially at right angles to the direction of the flow of the plastics melt. It will be appreciated that if the inlet and exit ports are spaced in the direction of this flow and filter ribbon 1 passes obliquely across enclosure 2 then the effective filtering aperture will be enlarged and the pressure drop across the filter will be minimized.

Economy in the consumption of filter cloth may be achieved by using an endless, recirculating filter ribbon loop; the impurities are filtered out as in the preceding embodiments of the invention and the surrounding solidified plastics material forming the sleeve 22 may be continuously removed, together with the entrapped impurities for example by melting or by solvent extraction.

It will be appreciated by those skilled in the art that the examples given merely illustrate, by no means exhaustively, the numerous ways in which the invention may be applied; the essential feature of the invention being that the filter is provided in the form of an extended ribbon which passes through a filtering enclosure sealed by partially or fully solidified end plugs formed of the material which is being filtered. Replacement of the clogged filter areas and removal of the impurities from the stream of the material being filtered is achieved by a substantially transverse movement of the filter ribbon. This may most simply be brought about by utilizing the hydrostatic pressure present in extruders but may also be caused, enhanced or retarded by direct mechanical pull at either end of the ribbon. It will be readily seen that the scope of the invention is not limited to extruders or to plastics materials but embraces the filtering of other substances in the substantially fluid state which are capable of sufficient substantially fluid state which are capable of sufficient thermal solidification to effect a satisfactory seal. It will be clear also that the cross section of the filter ribbon 1 need not be of a flat rectangular shape but may be wavy or channel shaped or of any other configuration as best suited to the individual filtering application concerned. Furthermore heat insulating gaskets may be introduced between the ports 3, 4 and enclosure 2. Such gaskets may be of polytetrafluoro ethylene.

I claim:
1. A process for filtering a heat-softened substance flowing through a passage comprising the steps of introducing a filter in the form of a filter band or ribbon by passing it through inlet and outlet ports flanking said passage so that a part of the filter extends across said passage, forcing the substance through the filter part to filter said substance whilst providing temperature conditions at said inlet and outlet ports resulting in the formation within said ports of sealing plugs of said substance of adequate rigidity to prevent substantial leakage at said ports and, when desired, effecting movement of said filter through said ports under conditions providing for self-maintenance of said sealing plugs to introduce another part of said filter band or ribbon into said passage.

2. A process as claimed in claim 1 wherein the filter band or ribbon is keyed to the sealing plug within the outlet port and wherein the hydrostatic pressure of said substance within said passage acting on said sealing plug within the outlet port is utilised to move said filter band or ribbon as a result of controlled extrusion of said outlet sealing plug.

3. A process as claimed in claim 1 wherein movement of said filter band or ribbon is effected intermittently.

4. A process as claimed in claim 1 wherein movement of said filter band or ribbon is effected continuously.

5. A process as claimed in claim 1 including regulating the temperature of at least one of said sealing plugs to effect intermittent movement of said filter.

6. A process as claimed in claim 2 including regulating the temperature of at least said outlet sealing plug to effect intermittent movement of said filter.

7. A process as claimed in claim 1 including applying a tractive force to said filter at exit from said outlet port to effect movement thereof.

8. A process as claimed in claim 7 wherein said tractive force is applied intermittently to effect intermittent movement of said filter.

9. A process as claimed in claim 2 including applying a retarding force and to said filter to control movement thereof.

10. A process as claimed in claim 9 including applying a retarding force sufficient to prevent movement of said filter and intermittently relaxing said force for intermittent movement of said filter.

11. A process as claimed in claim 2 including varying the hydrostatic force acting on said outlet sealing plug to control the rate of movement of said filter.

12. A process as claimed in claim 2 wherein movement of said filter band or ribbon is affected continuously and including regulating the temperature of at least one of said sealing plugs to control the rate of movement of said filter.

13. A process as claimed in claim 2 wherein movement of said filter band or ribbon is effected continuously and including controlling the rate of movement of said filter by varying the geometry of at least one of said ports.

14. A process as claimed in claim 13 including varying the aperture size of said outlet port to control the rate of movement of said filter.

15. A process as claimed in claim 1 in which said substance is a heat-softened plastics material.

16. A process as claimed in claim 5 in which said substance is a heat-softened plastics material.

17. A process as claimed in claim 1 wherein said filter is provided as an endless ribbon loop and including cleaning said filter part after movement through said passage and recirculating said cleaned filter loop.

18. A filtering device, for filtering a heat-softened substance, including a body defining a passage through which said substance can be caused to flow and slotted inlet and outlet ports flanking said passage through which a filter in the form of a band or ribbon is passed and can be moved to introduce different parts of said filter across said passage, said ports being adapted for the formation therein, in use, of sealing plugs of the substance being filtered permitting movement of said filter through said slots without substantial leakage of said substance, and means to provide temperature conditions at said ports to form said plugs.

19. A filtering device as claimed in claim 18 including a perforated breaker plate disposed in said passage to provide a downstream support for said filter band or ribbon.

20. A filtering device as claimed in claim 18 wherein each slotted port defines an extended channel through which said filter passes.

21. A filtering device as claimed in claim 20 wherein said channel of at least one port is locally constricted.

22. A filtering device as claimed in claim 21 wherein said constriction is provided by at least one adjustable protrusion extending into said channel.

23. A filtering device as claimed in claim 20 including means for controlling the temperature of each port.

24. A filtering device as claimed in claim 20 wherein the channel of at least one of said ports is of wavy form.

25. A filtering device as claimed in claim 20 wherein the channel of at least one of said ports is parallel sided over at least part of its length.

26. A filtering device as claimed in claim 20 wherein the channel of said outlet port narrows at least along a part of its length in the direction of filter movement.

27. A filtering device as claimed in claim 20 wherein said outlet port channel has a parallel sided section and a section which narrows in the direction of filter movement.

28. A filtering device as claimed in claim 27 including means for cooling the parallel sided section and means for heating the narrowing section of said channel.

29. A filtering device as claimed in claim 28 including a neck between the two sections to limit heat transfer therebetween.

30. A filtering device as claimed in claim 28 wherein the parallel sided section is farthest from said passage.

31. A filtering device as claimed in claim 23 wherein said channel defining ports are formed separately from said passage-defining body and including heat-insulating gaskets between said ports and said body.

32. A filtering device as claimed in claim 28 wherein said cooling means comprises coolant channels and said heating means comprises electric heaters.

33. A filtering device as claimed in claim 26 wherein the outlet port presents a greater effective area to said passage than the inlet port to provide a net hydrostatic force for moving said filter through said device.

34. A filtering device as claimed in claim 33 including means for controlling the temperatures of said sealing ports.

35. A filtering device as claimed in claim 33 including means for varying the aperture size of at least one of said ports.

36. A filtering device as claimed in claim 18 wherein at least one sealing port is assembled from alternate parts made of materials of dissimilar thermal conductivities facilitating the establishment of a predetermined temperature gradient along the port.

37. A filtering device as claimed in claim 18 including means for applying traction to the filter at exit from said outlet port.

38. A filtering device as claimed in claim 37 wherein said traction-applying means is a gripping device.

39. A filtering device as claimed in claim 37 wherein said traction-applying means is a capstan device.

40. A filtering device as claimed in claim 33 including means for applying a retarding force to said filter to regulate movement thereof through said device under said net hydrostatic force.

41. A filtering device as claimed in claim 33 including means for varying the effective area of one of said ports to vary the net hydrostatic force acting on said filter.

42. A filtering device as claimed in claim 35 wherein said means for varying the aperture size includes an adjustable side wall of said channel.

43. A filtering device as claimed in claim 33 wherein said inlet port channel is parallel sided.

References Cited

UNITED STATES PATENTS

| | | | |
|---|---|---|---|
| 1,806,701 | 5/1931 | Moreton | 210—184 |
| 2,218,453 | 10/1940 | Mickle | 210—387 X |
| 2,675,129 | 4/1954 | Doubleday | 210—387 X |
| 3,138,015 | 6/1964 | Avery | 210—387 X |
| 3,310,172 | 3/1967 | Beduhn | 210—387 X |

SAMIH N. ZAHARNA, Primary Examiner

U.S. Cl. X.R.

210—77, 179, 184, 387; 264—327